(12) United States Patent
Povinelli et al.

(10) Patent No.: US 11,584,452 B2
(45) Date of Patent: *Feb. 21, 2023

(54) ACTIVE FRONT DEFLECTOR

(71) Applicant: Magna Exteriors Inc., Concord (CA)

(72) Inventors: Anthony J. Povinelli, Romeo, MI (US); Martin R. Matthews, Troy, MI (US); Jeffrey B. Manhire, Rochester, MI (US)

(73) Assignee: Magna Exteriors Inc., Concord (CA)

( * ) Notice: Subject to any disclaimer, the term of this patent is extended or adjusted under 35 U.S.C. 154(b) by 109 days.

This patent is subject to a terminal disclaimer.

(21) Appl. No.: 17/138,345

(22) Filed: Dec. 30, 2020

(65) Prior Publication Data

US 2021/0114671 A1 Apr. 22, 2021

Related U.S. Application Data

(63) Continuation of application No. 16/555,722, filed on Aug. 29, 2019, now Pat. No. 10,906,598, which is a continuation of application No. 15/833,422, filed on Dec. 6, 2017, now Pat. No. 10,435,084, which is a continuation of application No. 15/318,193, filed as application No. PCT/US2015/035105 on Jun. 10, 2016, now Pat. No. 9,950,754.

(60) Provisional application No. 62/010,840, filed on Jun. 11, 2014.

(51) Int. Cl.
*B62D 35/00* (2006.01)
*B62D 35/02* (2006.01)
*B62D 37/02* (2006.01)

(52) U.S. Cl.
CPC ........... *B62D 35/005* (2013.01); *B62D 35/02* (2013.01); *B62D 37/02* (2013.01); *Y02T 10/82* (2013.01)

(58) Field of Classification Search
CPC ...... B62D 35/00; B62D 35/005; B62D 35/02; B62D 37/02
See application file for complete search history.

(56) References Cited

U.S. PATENT DOCUMENTS

| 4,159,140 A | * | 6/1979 | Chabot | B62D 35/005 296/180.5 |
| 4,489,806 A | * | 12/1984 | Shimomura | B62D 35/005 296/180.5 |
| 4,582,351 A | * | 4/1986 | Edwards | B60R 19/56 293/118 |

(Continued)

*Primary Examiner* — Gregory A Blankenship
(74) *Attorney, Agent, or Firm* — Warn Partners, P.C.

(57) ABSTRACT

An active front deflector assembly having a deflector panel, actuator, and linkage assemblies each with a predetermined ratio of the links to each other for motion of the deflector panel. The assembly deploys and retracts based on vehicle requirements, and, when deployed, redirects the air flow in the front of the vehicle to improve the vehicle aerodynamics for either fuel economy or performance characteristics. Additionally, it allows for the deflector panel to retract so the vehicle meets ground clearances, etc. The deflector panel is also both rigid and semi-rigid to absorb impact energy. The drive shaft transmits the drive from the actuator coupled to one linkage assembly to the other linkage assembly for moving the deflector panel between the deployed/retracted positions. The actuator is clutched to prevent damage to the system.

20 Claims, 5 Drawing Sheets

(56) References Cited

U.S. PATENT DOCUMENTS

| | | | | |
|---|---|---|---|---|
| 4,585,262 A * | 4/1986 | Parks | B62D 35/005 | 296/180.1 |
| 4,659,130 A * | 4/1987 | Dimora | B62D 35/005 | 296/180.1 |
| 4,904,016 A * | 2/1990 | Tatsumi | B62D 35/005 | 296/180.5 |
| 4,951,994 A * | 8/1990 | Miwa | B62D 35/005 | 296/180.1 |
| 6,886,883 B2 * | 5/2005 | Jacquemard | B62D 35/005 | 293/118 |
| 7,481,482 B2 * | 1/2009 | Grave | B62D 35/007 | 296/180.1 |
| 7,775,582 B2 * | 8/2010 | Browne | B62D 35/005 | 296/180.1 |
| 7,780,223 B2 * | 8/2010 | Kottenstette | B62D 35/005 | 296/180.1 |
| 8,186,746 B2 * | 5/2012 | Mackenzie | B60R 19/40 | 296/180.5 |
| 8,702,152 B1 * | 4/2014 | Platto | B62D 37/02 | 296/180.1 |
| 8,887,845 B2 * | 11/2014 | McDonald | B62D 35/005 | 296/180.5 |
| 9,021,801 B2 * | 5/2015 | Gao | B60K 11/085 | 60/528 |
| 9,039,068 B2 * | 5/2015 | Niemi | B62D 35/005 | 296/180.1 |
| 9,150,261 B2 * | 10/2015 | DeAngelis | B62D 37/02 | |
| 9,950,754 B2 * | 4/2018 | Povinelli | B62D 37/02 | |
| 9,956,998 B2 * | 5/2018 | Zielinski | B62D 37/02 | |
| 10,124,839 B2 * | 11/2018 | Povinelli | B62D 35/02 | |
| 10,300,966 B2 * | 5/2019 | Cha | B62D 35/007 | |
| 10,351,182 B2 * | 7/2019 | Zielinski | B62D 37/02 | |
| 10,377,428 B2 * | 8/2019 | Povinelli | B62D 35/005 | |
| 10,435,084 B2 * | 10/2019 | Povinelli | B62D 37/02 | |
| 10,906,598 B2 * | 2/2021 | Povinelli | B62D 35/02 | |
| 2007/0063541 A1 * | 3/2007 | Browne | B62D 35/00 | 296/180.1 |
| 2010/0140976 A1 * | 6/2010 | Browne | B62D 35/005 | 296/180.1 |
| 2012/0330513 A1 * | 12/2012 | Charnesky | B62D 35/005 | 701/49 |
| 2015/0084369 A1 * | 3/2015 | Niemi | B62D 35/005 | 296/180.1 |
| 2016/0229467 A1 * | 8/2016 | Miller | G01S 13/931 | |
| 2017/0101136 A1 * | 4/2017 | Zielinski | B62D 37/02 | |
| 2017/0106922 A1 * | 4/2017 | Povinelli | B62D 35/005 | |
| 2017/0120968 A1 * | 5/2017 | Povinelli | B62D 37/02 | |
| 2017/0137074 A1 * | 5/2017 | Miller | G01S 17/931 | |
| 2019/0106163 A1 * | 4/2019 | Fahland | B62D 37/02 | |
| 2021/0009210 A1 * | 1/2021 | Matthews | B62D 35/005 | |
| 2021/0221449 A1 * | 7/2021 | Milani | B60R 3/02 | |
| 2021/0252753 A1 * | 8/2021 | O'Brien | B62D 35/00 | |
| 2022/0130183 A1 * | 4/2022 | Salter | G07C 5/06 | |

* cited by examiner

ACTIVE FRONT DEFLECTOR

CROSS-REFERENCE TO RELATED APPLICATIONS

This application is a continuation of a U.S. patent application Ser. No. 16/555,722, filed Aug. 29, 2019, which is a continuation of a U.S. patent application Ser. No. 15/833, 422, filed Dec. 6, 2017, issued as U.S. Pat. No. 10,435,084 on Oct. 8, 2019, which is a continuation of U.S. patent application Ser. No. 15/318,193, filed Dec. 12, 2016, issued as U.S. Pat. No. 9,950,754 on Apr. 24, 2018, which is a National Stage of International Application No. PCT/US2015/035105, filed Jun. 10, 2015, which claims the benefit of U.S. Provisional Patent Application No. 62/010, 840, filed Jun. 11, 2014. The disclosures of the above application applications are incorporated herein by reference.

FIELD OF THE INVENTION

The present invention relates to a panel structure for use in an active front deflector system for automotive applications.

BACKGROUND OF THE INVENTION

There is a considerable loss of aerodynamic efficiency in vehicles, in particular, due to the airflow underneath and around a vehicle. Conventional structures, such as fixed panels or fixed air deflectors/dams using flexible materials, are known and do not meet desired requirements, including, but not limited to, conventional structures do not provide an effective sealed and clutchable actuator with communication capability and life cycle durability, a system that is capable of object detection, or a system that is durable and aerodynamically effective. These fixed air deflector/dams are still a compromise as they cannot be made to the optimum height without compromising specifications and compromising to other vehicle capabilities. Further, these air dams even when flexible are still damaged during off-roading or when added ground clearance is needed.

Accordingly, there is a desire for an active front deflector that provides an aerodynamic surface for improved aerodynamic when deployed, but is retractable out of the way under predetermined conditions to return the vehicle to its initial design intent.

SUMMARY OF THE INVENTION

There is provided an aerodynamic surface which improves aerodynamics when deployed and is retractable out of the way to return the vehicle to its initial design intent, as well as capability to absorb impacts through a linkage arrangement and clutched drive system. The present invention is directed to an active front deflector assembly having a deflector panel that is movable with a clutched drive assembly attached to a linkage arrangement. The active front deflector assembly is capable of absorbing impacts through this linkage arrangement and clutched drive assembly. The active front deflector assembly is retractable so that it does not compromise the vehicle capabilities for conditions such as when added ground clearance is needed, and is deployable for normal driving conditions. When in the extended or deployed position, the deflector panel improves airflow under predetermined conditions. When in the retracted or stowed position, the deflector panel generally moves or folds out of the way toward under the vehicle.

The active front deflector assembly has a four bar linkage arrangement with ratios of the links to one another that are critical to the desired motion of the deflector panel. The actuator is also clutched to prevent damage to the system. In addition, a drive shaft transmits the drive force from the left side to the right side of the linkage arrangement. The deflector panel is both rigid and semi-rigid to further help absorb impact energy.

The retractable deflector located in the front of the vehicle under the vehicle body is capable of changing the vehicle aerodynamics. The deflector redirects the air flow in the front of the vehicle to improve the vehicles aerodynamics for either fuel economy or performance characteristics. The deflector is held in place by two four bar linkages with specific geometry that will allow them to absorb a large impact by folding up and away from the impact to protect the system. This is achieved with a clutched drive system attached to the linkage arrangement.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to FIGS. 1-6 generally, in accordance with the present invention, there is provided an active front deflector assembly generally shown at 10, movable between a stowed position (or "retracted" position) and a deployed position (or "extended" position) under predetermined conditions. The active front deflector assembly provides an active full air deflector that deploys and retracts based on vehicle requirements. This allows for a deployment lower than fixed panel systems to significantly reduce drag, reduce emissions, improves fuel economy, (and/or improve active grille shutter performance when used in combination with the active front deflector assembly). Additionally, it allows for the system to retract so the vehicle can still meet ground clearances, ramp angles, off-road requirements, etc. In the event of impact while the system is deployed, the actuator allows the system to retract and/or move freely to help prevent damage. These are significant improvements over typical vehicle systems utilizing a fixed sacrificial panel below and/or near the fascia to achieve basic and less effective aerodynamic improvements.

Figure 1:
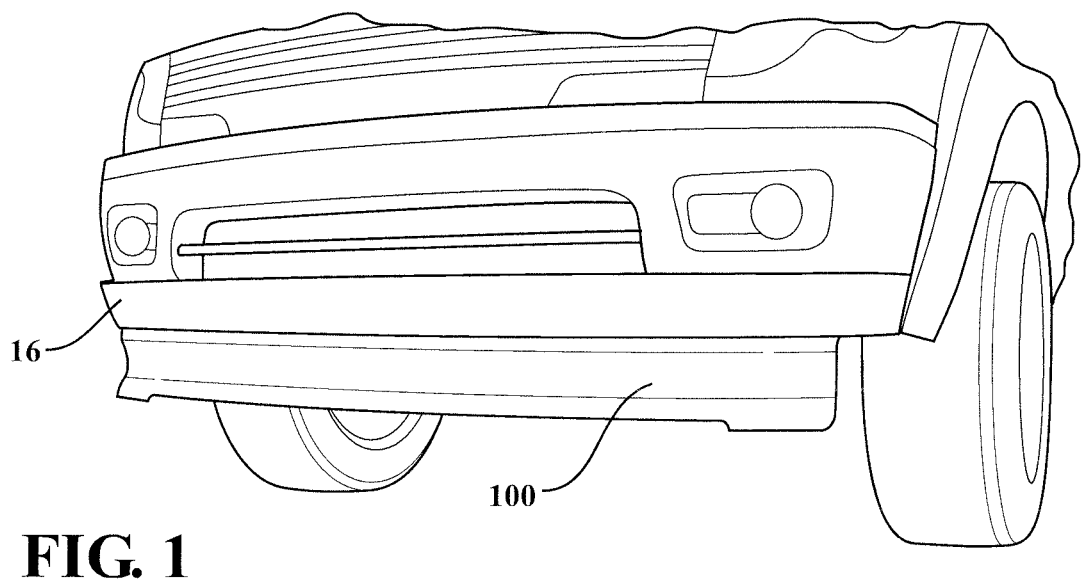
FIG. 1 is a perspective view of a vehicle with an active front deflector assembly in a deployed position, in accordance with the present invention.

FIG. 1 is a perspective view of an active front deflector assembly 100 shown in an environment of use attached to a vehicle 16, in accordance with the present invention. This is typical of the environment and shows the active front deflector system 100 in the deployed position, in accordance with the present invention.

Referring to FIGS. 2-5 generally, in accordance with another embodiment of the present invention, there is provided an active front deflector assembly generally shown at 10 movable between a stowed position (or "retracted" position) and a deployed position (or "extended" position) under predetermined conditions. The active front deflector assembly 10 generally includes at least one deflector panel 1 that is made from a semi-rigid material with a rigid upper spine 2 portion. Most preferably, the semi-rigid and rigid portion are integrally formed.

The deflector panel 1 is coupled to at least two linkage assemblies generally shown at 12, 14 that are four bar linkages. The two four bar linkage assemblies 12, 14 are spaced apart a predetermined suitable distance to provide strength, durability, and installation on the vehicle, while preventing binding and allowing smooth transitioning between the deployed and retracted positions.

Each linkage assembly 12, 14 has a drive link 3 and a follower link 4 pivotally connected to a coupler link 5 and pivotally connected to a fixed base link 6. The coupler link 5 also includes a mounting portion 18, e.g., an integrally formed mounting bracket with apertures for receiving fasteners, to operably couple each of the respective linkage assemblies 12, 14 to the rigid spine 2 of the deflector panel 1. In this embodiment, there are two linkage assemblies 12, 14 used with each active front deflector assembly 10. However, it is within the scope of the invention that more or less linkage assemblies 12, 14 may be used, depending upon the length of the assembly 10 and particular application.

At least one fastener 20 (FIGS. 4-5) is used to connect each of the mounting portions 18 to the rigid portion 2 of the deflector panel 1.

Figure 2:
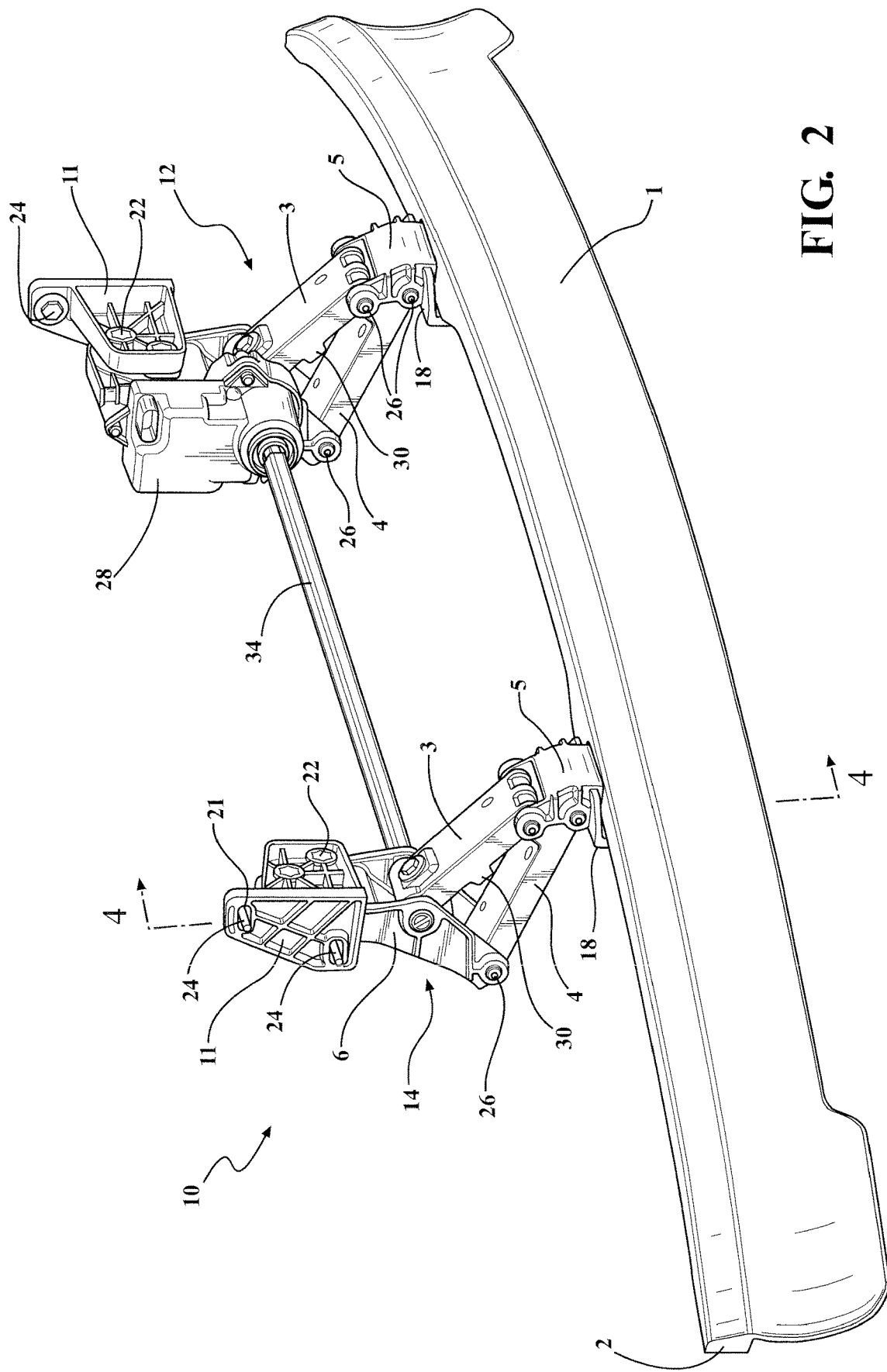
FIG. 2, is a perspective view of an active front deflector assembly shown in a deployed position, in accordance with the present invention.
Figure 6:
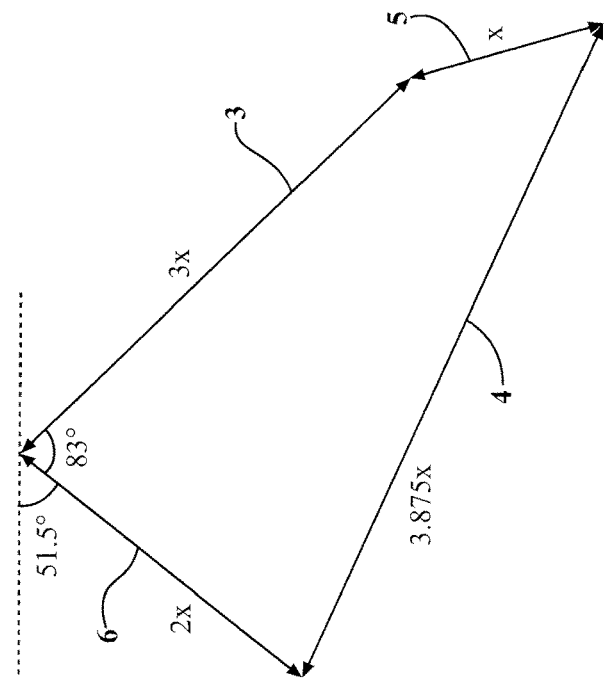
FIG. 6, is a schematic of linkage ratios of the active front deflector assembly in a deployed position, in accordance with the present invention.

The assembly 10 is operably supported and connected to a fascia portion of the vehicle 16, bumper reinforcement, fenders, frame or any other vehicle structure or molding for securing the linkages of the assembly 10 to the vehicle 16. The assembly 10 is attached to the underside of the vehicle 16 towards the front with at least two attachment brackets 11 (FIG. 2). Each attachment bracket 11 is connected to the fixed base link 6 of each linkage assembly 12, 14 with at least one fastener 22. Each of the linkage assemblies 12, 14 is then attached to the vehicle 16 by at least one fastener 24. Each fastener 24 extends through a corresponding one of a plurality of first apertures 21 formed as part of attachment brackets 11. All of the fasteners in this embodiment are nut and bolt combinations, but it is within the scope of the invention that other fasteners, such as rivets, may be used as well.

The coupler link 5 includes at least two pairs of apertures through which two additional fasteners 26 extend, respectively, and each respective fastener 26 also extends through a corresponding end of the drive link 3 and follower link 4, e.g., through a cylindrical-shaped opening formed in the links 3, 4, thereby pivotably connecting the drive link 3 and follower link 4 to the coupler link 5. The fixed base link 6 also has at least one pair of apertures through which an additional fastener extends, which fastener 26 also extends through a corresponding end of the follower link 4, thereby pivotably connecting the follower link 4 to the fixed base link 6.

The coupler link 5, drive link 3, follower link 4, and fixed base link 6 of the two four bar linkage assemblies 12, 14 are at predetermined suitable angles and ratios to each other to effectively move the deflector panel 1 between the deployed and retracted position.

In the deployed position, each of the linkage assemblies 12, 14 form a trapezium shape. The angle between the fixed base link 6 and drive link 3 in the deployed position is 75-85 degrees. The fixed base link 6 is two times (2×) the length of the coupler link 5; and/or the drive link 3 is three times (3×) the length of the coupler link 5; and/or the follower link 4 is 3.875 times the length of the coupler link 5 (See also FIG. 6).

The two four bar linkage assemblies 12, 14 and the ratio of the links to each other is critical to the motion of the deflector panel 1.

The active front deflector assembly 10 is attached to the underside of the vehicle towards the front, e.g., using attachment brackets 11 of the fixed base link 6 with fasteners. In the deployed position (generally down) the deflector panel 1 is in the air flow (see FIG. 4); the rigid part 2 is not in the air flow and is protected by the vehicle body 13. The deflector panel 1 interrupts the air flow (depicted as arrow in FIG. 4) thereby improving the vehicle aerodynamics. However, this deployed positioning reduces the vehicle ground clearance. When the vehicle needs its full ground clearance capabilities the deflector panel 1 is retracted (generally up) (e.g., see FIG. 5). This is achieved by the actuator 28 (FIG. 2).

At least the drive link 3 and follower link 4 each have strengthening features, e.g., such as generally a U-shape and/or other suitable structure to add strength while minimizing weight, along its length from one joint area to the other joint area of the links.

The drive links 3 also have at least one tab 30 that is downward projecting and is located such that when in the retracted position the tab 30 acts as a stop coming into contact with a respective upper raised segment 32 of the follower link 4.

One of the linkage assemblies 12, 14 e.g., the left hand four bar linkage 12, also has the actuator 28 coupled therewith. The linkage assemblies 12, 14 are connected to the deflector panel 1,2 and to a drive shaft 34 which is coupled to the actuator 28. The linkage assemblies 12, 14 are joined by the deflector 1, 2 (via coupler link 5 of both linkages 12, 14) and the drive shaft 34. Retraction and deployment of the active front deflector assembly 10 is achieved by the actuator 28.

The actuator 28 is attached to the drive shaft 34 which is attached toward the ends of the drive links 3 of both linkage assemblies 12, 14. The drive shaft 34 also extends through apertures formed in both fixed base links 6 adjacent to the corresponding ends of the drive links 3. In operation the actuator 28 rotates the drive shaft 34 which rotates the drive links 3 upward causing the follower 4 and coupler links 5 up and the deflector panel 1 to rise and fold back out of the air flow (FIG. 5) to the retracted position. The actuator 28 rotates the drive shaft 34 in the opposite direction to rotate the drive links 3 downward causing the follower 4 and coupler links 5 down and the deflector panel 1 to lower and extend into the air flow (e.g., FIG. 4) to the deployed position.

The actuator 28 is clutched to prevent damage to the system, which is another significant advantage. The drive shaft 34 transmits the drive from the left side to the right side, or vice versa, depending on the mounted location of the actuator 28. The deflector 1, 2 is both rigid and semi-rigid to absorb impact energy, which is yet another significant advantage.

The actuator 28 is a rotary actuator, e.g., with feedback options, hex-type, screw-type drive, higher speed actuator, electric, mechanical, linear, e.g., with current override circuits, declutching, hydraulic, pneumatic, extending, power lift actuator, or any other actuator and combinations thereof depending on the application and predetermined vehicle needs.

In the event that an object strikes the deflector panel 1 in the deployed position the system is designed to absorb the energy, but if the impact exceeds a predetermined set level it is released by the actuator's 28 internal clutch allowing it to move with the impact preventing damage to the system.

In a preferred embodiment, the actuator 28 has internal clutching that de-clutches or disengages gears allowing the deflector panel 1 to rotate or move out of the way under a predetermined condition to help prevent damage to the active front deflector assembly 10. By way of example, upon impact of a predetermined force to the deflector panel 1 the actuator 28 will clutch to disengage the gearing so that the deflector panel 1 can move freely out of the way.

The clutchable actuator 28 is sealed and has communication capability with the vehicle 16. The actuator 28 and the vehicle 16 also communicate to deploy and retract the deflector panel 1 based upon predetermined conditions such as vehicle speed, wind direction, yaw, etc, and combinations thereof. By way of non-limiting example, the deflector panel 1 is retracted until the vehicle reaches a predetermined speed of 30 miles per hour, e.g., about 30-40 mph, then the deflector panel 1 is extended and stays deployed until the vehicle drops back down to below the predetermined speed or other predetermined conditions for continued deployment are no longer met.

Suitable electontronics most preferably, a shut off printed circuit board (PCB) with connector contacts correlate with vehicle communication networks for commanding a motor based upon predetermined conditions, e.g., commanding energizing of the motor correlating with predetermined vehicle speed ranges. The PCB electronics senses current spike for override, which allows the clutch to disengage the drive system allowing it to rotate freely.

Figure 3:
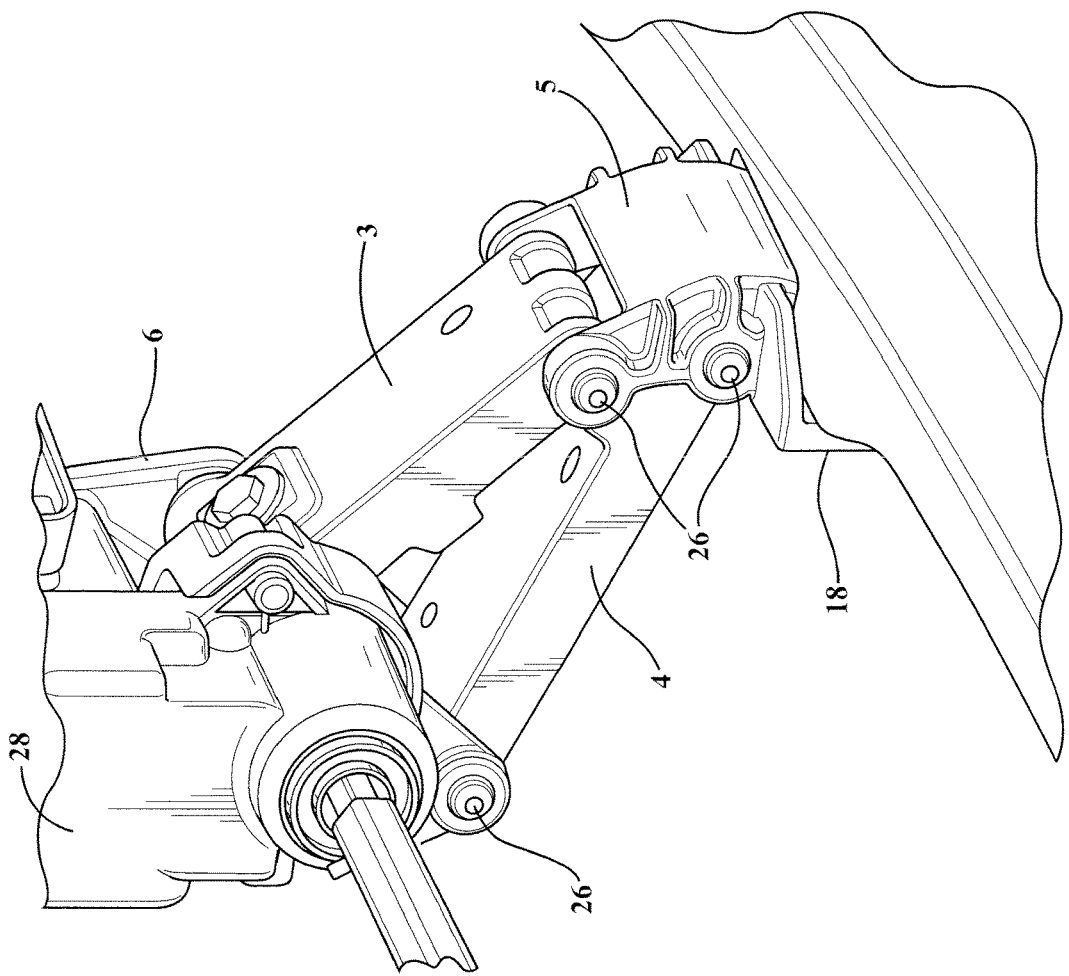
FIG. 3, is an enlarged broken-away perspective view of depicting part of a linkage assembly and deflector panel of the active front deflector system of FIG. 2 shown in a deployed position, in accordance with the present invention.
Figure 4:
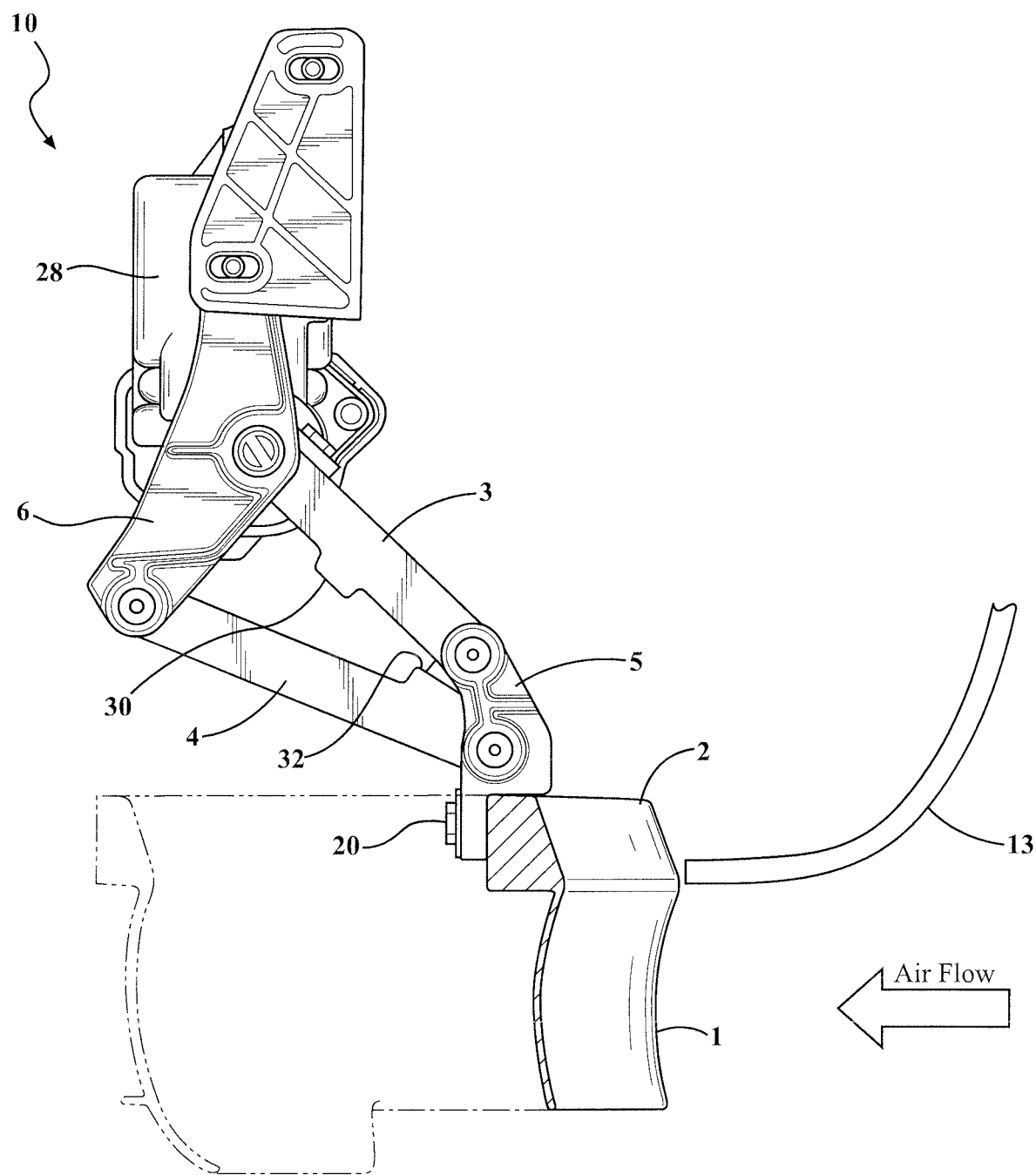
FIG. 4 is an enlarged sectional side view taken along 4-4 of FIG. 2 depicting the deployed active front deflector assembly, in accordance with the present invention.
Figure 5:
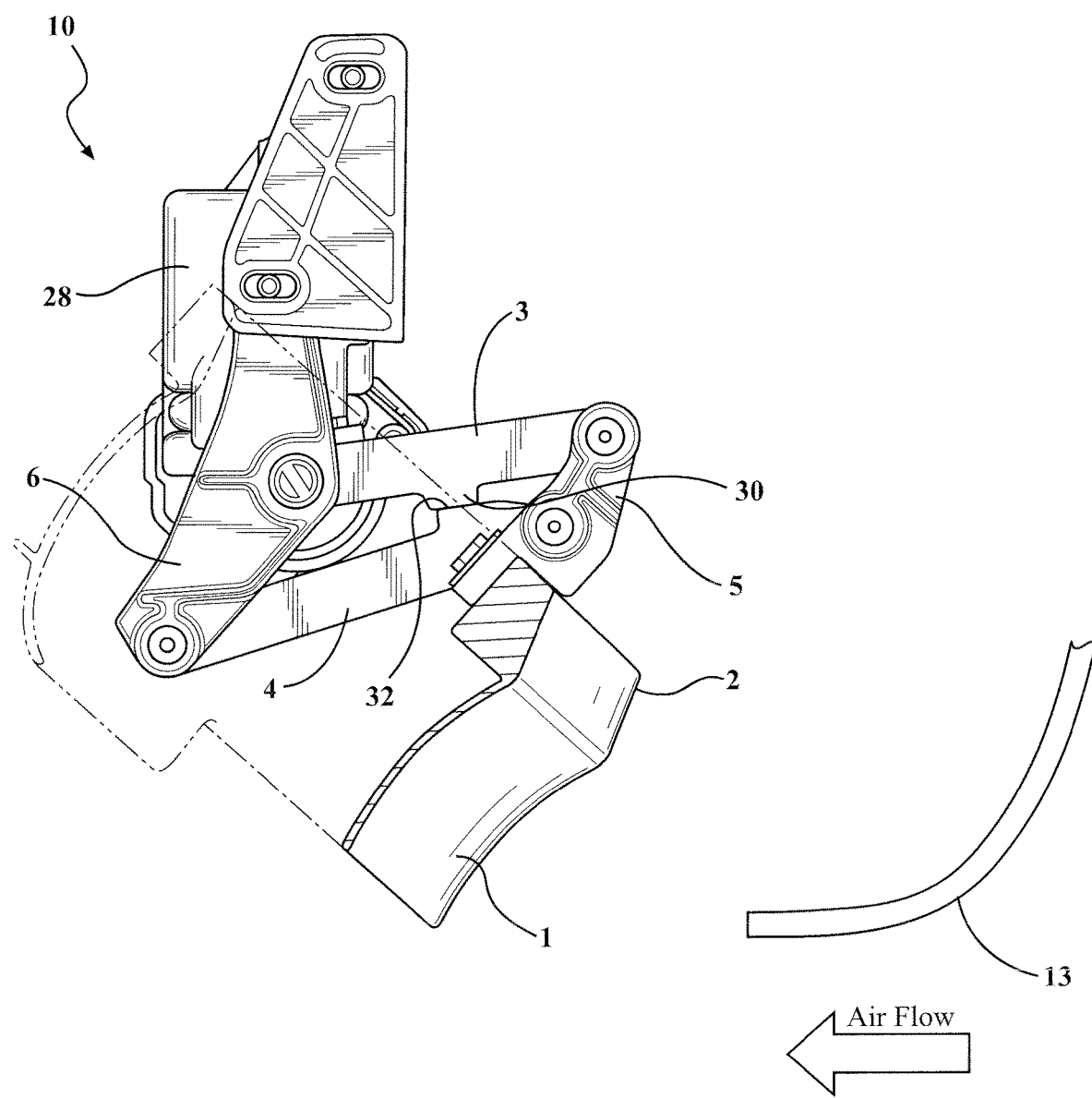
FIG. 5, is an enlarged broken-away side view of the active front deflector assembly of FIG. 2 shown in a retracted position, in accordance with the present invention.

In the event that an object strikes the deflector panel 1 in the deployed position the system is designed to absorb the energy, but if the impact exceeds a predetermined set level it is released by the actuator's internal clutch allowing it to move with the impact preventing damage to the system. This motion is achieved with the geometry of the four bar linkage systems 12, 14 and the ratio of the links to each other (FIG. 3).

When the deflector panel 1 is in the fully deployed position it extends to about 90°. Accordingly, the deflector panel 1 extends generally vertically along the vehicle 16 front to prevent air from ducking under and swirling under the vehicle 16 where it is turbulent due to all of the components under the vehicle 16, and reduces drag. The deflector panel 1 generally follows the curvature of the front end of the vehicle and/or can be scooped or concaved or other suitable shape/profile to further direct air flow depending on the application. When the deflector panel 1 is down in the deployed position it is extended generally about one quarter to one half of the distance to the traversed ground surface, preferably, about one third of the distance.

The deflector panel 1 is made of a composite plastic in this particular embodiment. However, it is also within the scope of the invention to manufacture the deflector panel 1 of different materials such as steel or aluminum (depending on the particular application), painted carbon fiber, extruded rubber, or other suitable impact resistant material to withstand a predetermined load without departing from the scope of the invention. Additionally, the deflector panel 1 may consist of a single piece, e.g., of molded composite plastic, or multiple pieces assembled together.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An active front deflector assembly adapted for a vehicle, comprising:
   at least one deflector panel that selectively deploys and retracts, where the deployment of the deflector panel to at least one deployed position improves aerodynamics by redirecting frontal air flow to prevent front air flow to the underbody of the vehicle;
   at least two linkage assemblies attached to the deflector panel and adapted to attach to the vehicle, each linkage assembly forming a trapezium shape when in the deployed position;
   a drive shaft operably coupled to the at least two linkage assemblies wherein the drive shaft transmits the drive from one linkage assembly to the other; and
   an actuator operably coupled to the linkage assemblies, where the actuator deploys and retracts the deflector panel under predetermined conditions.

2. The active front deflector assembly of claim 1, wherein the deflector panel is semi-rigid with a rigid upper spine, to absorb impact energy.

3. The active front deflector assembly of claim 2, wherein when in the deployed position during vehicle movement the rigid upper spine is not in the air flow.

4. The active front deflector assembly of claim 1, wherein the actuator correlates with vehicle communication networks for commanding operation of the actuator based upon predetermined conditions.

5. The active front deflector assembly of claim 1, wherein the predetermined conditions are selected from the group consisting of vehicle speed, wind direction, yaw, and combinations thereof.

6. The active front deflector assembly of claim 1, wherein the predetermined condition for deploying the deflector panel is vehicle speed in the range of at least 30 miles per hour.

7. The active front deflector assembly of claim 1, wherein the predetermined condition for retracting the deflector panel is vehicle speed in the range of less than 30 miles per hour and/or when the actuator senses higher than desired predetermined loads.

8. The active front deflector assembly of claim 1, wherein the actuator senses current spike upon impact at a predetermined force causing circuit override for declutching so that the deflector panel moves freely out of the way to prevent damage.

9. The active front deflector assembly of claim 1, wherein the at least two linkage assemblies each further comprise:
a coupler link attached to the deflector panel;
a first link, where the first link is adapted to attach to the vehicle;
a second link pivotably connected to the coupler link and first link; and
a third link pivotably connected to the coupler link and first link;
where the coupler link, second link, third link, and first link are at predetermined angles and ratios to each other to move the deflector panel between the deployed and a retracted position.

10. The active front deflector assembly of claim 1, wherein, when in the deployed position, an angle between a first link and a second link of the at least two linkage assemblies in the deployed position is about 75-85 degrees.

11. The active front deflector assembly of claim 1, wherein the at least two linkage assemblies further comprise a coupler link, first link, second and third link, wherein the length of the first link is about two times the length of at least one of said links, and, the second link is about three times the length of at least one of said links, and, the third link is about 3.875 times the length of at least one of said links.

12. The active front deflector assembly of claim 1, wherein the actuator has object detection and declutches upon impact at a predetermined force the deflector panel to rotate freely out of the way to prevent damage, wherein this motion is achieved with the geometry of the linkage systems and the ratio of the links to each other.

13. The active front deflector assembly of claim 1, wherein the actuator is operably connected to the drive shaft which is attached to said at least two linkage assemblies by a plurality of first links and second links adapted to connect to said drive shaft, where rotation of the drive shaft in a first direction rotates said drive links upward causing respective third links and respective coupler links up and the deflector panel to rise to the retracted position, and wherein rotation of the drive shaft in the opposite direction rotates the first links and second downward causing the respective third links and coupler links down and the deflector panel to lower into the deployed position.

14. The active front deflector assembly of claim 9, wherein each coupler link has a mounting portion connected to a rigid upper spine portion of the deflector panel with at least one fastener.

15. The active front deflector assembly of claim 1, further comprising at least one attachment bracket connected to each of the linkage assemblies, wherein the attachment brackets are adapted to connect the active front assembly to the vehicle using at least one fastener.

16. An active front deflector assembly adapted for a motor vehicle, comprising:
at least one deflector panel including a semi-rigid portion, where the deflector panel selectively deploys and retracts between a stowed position and at least one deployed position within an air flow, where the deployment of the deflector panel improves aerodynamics by redirecting frontal air flow to reduce front air flow to the underbody of the vehicle;
at least two linkage assemblies attached to the deflector panel and adapted to operably connect to the vehicle, each linkage assembly forming only a trapezium shape when in the deployed position; and
an actuator including a drive shaft operably coupled to the at least two linkage assemblies, where the actuator has object detection and is in communication with the vehicle and automatically deploys the deployable panel under predetermined conditions and automatically retracts the deployable panel when predetermined conditions for continued deployment are no longer met;
wherein the predetermined conditions are selected from the group consisting of vehicle speeds, forces/loads, wind directions, yaw, and combinations thereof.

17. The active front deflector assembly of claim 16, wherein the at least two linkage assemblies each further comprise:
a coupler link, where the coupler link is attached to an upper spine of the deflector panel;
a fixed base link, where the fixed base link is adapted to connect to the vehicle;
a drive link pivotably connected to the coupler link and fixed base link; and
a follower link pivotably connected to the coupler link and fixed base link;
wherein, when in the deployed position, the angle between the fixed base link and drive link in the deployed position is about 75-85 degrees, and, the length of the fixed base link is longer than the length of the coupler link, and, the drive link is longer than the length of the coupler link, and, the follower link is longer than the length of the coupler link.

18. The active front deflector assembly of claim 16, wherein the actuator has object detection and declutches upon impact at a predetermined force the deflector panel to rotate freely out of the way to prevent damage, wherein this motion is achieved with the geometry of the linkage systems and the ratio of the links to each other.

19. The active front deflector assembly of claim 17, further comprising at least one tab located on the drive links that acts as a stop in the retracted position by coming into contact with a respective upper raised segment of the follower link.

20. An active front deflector assembly adapted for a vehicle, comprising:
at least one deflector panel selectively deployable and retractable, where the deployment of the deflector panel reduces drag and improves aerodynamics;
at least two linkage assemblies attached to the deflector panel and adapted to connect to the vehicle, each linkage assembly forming a trapezium shape; and
an actuator having a drive shaft operably coupled to the at least two linkage assemblies, where the actuator has object detection and automatically deploys the deployable panel under predetermined conditions and automatically retracts the deployable panel when predetermined conditions for continued deployment are no longer met, wherein the predetermined conditions are selected from the group consisting of vehicle speeds, forces/loads, wind directions, yaw, and combinations thereof;
wherein the at least two linkage assemblies each further comprise:
a coupler link, where the coupler link is attached to an upper spine of the deflector panel;
a first link, where the first link is adapted to attach toward the front of the vehicle;
a second link pivotably connected to the coupler link and first link; and
a third link pivotably connected to the coupler link and first link;
wherein, when in the deployed position, the angle between the first link and second link in the deployed position is about 75-85 degrees, and/or the length of the fixed base link is longer than the length of the coupler link, and/or the drive link is longer than the length of the coupler link, and/or the follower link is longer than the length of the coupler link.

\* \* \* \* \*